United States Patent [19]

Tankred et al.

[11] 4,348,607

[45] Sep. 7, 1982

[54] ELECTRIC MOTOR, PARTICULARLY MOTOR-COMPRESSOR

[75] Inventors: Hans J. Tankred, Sonderborg; Per J. Madsen, Nordborg; Jorgen C. Stannow, Sonderborg, all of Denmark

[73] Assignee: Danfoss A/S, Nordborg, Denmark

[21] Appl. No.: 239,168

[22] Filed: Feb. 27, 1981

Related U.S. Application Data

[63] Continuation of Ser. No. 30,512, Apr. 16, 1979, abandoned.

[30] Foreign Application Priority Data

Apr. 21, 1978 [DE] Fed. Rep. of Germany ....... 2817532

[51] Int. Cl.$^3$ .............................................. H02K 1/06
[52] U.S. Cl. ...................................... 310/217; 310/254
[58] Field of Search ................. 310/216, 217, 42, 254, 310/258, 259, 91, 179, 180, 66, 112; 417/420, 415

[56] References Cited

U.S. PATENT DOCUMENTS

| | | | |
|---|---|---|---|
| 2,001,799 | 5/1935 | Seyfried | 310/217 UX |
| 2,072,769 | 3/1937 | Reeder | 310/217 UX |
| 2,700,115 | 1/1955 | Mowery | 310/216 |
| 2,715,193 | 8/1955 | Staley | 310/217 |
| 3,343,013 | 9/1967 | Wightman | 310/217 |
| 3,600,111 | 8/1971 | Rogers | 417/415 |
| 3,610,784 | 10/1971 | Rundell | 310/254 |
| 4,085,347 | 4/1978 | Linchius | 310/217 |

*Primary Examiner*—R. Skudy
*Attorney, Agent, or Firm*—Wayne B. Easton

[57] ABSTRACT

The invention relates to a motor and compressor assembly of the type in which the frame member of the compressor unit includes the bearing for the motor shaft and is bolted to only one side of the packet of the stator laminations of the motor unit. The invention is directed to the prevention of misalignment between the compressor and motor units attributable to the bolting of the compressor unit to only one side of the packet of laminations which results in the bolt pressures or forces acting to clamp the laminations closer together on the bolt side than on the other side. The bad effects of this are avoided with the present invention by providing slots in the packet of laminations in close proximity to the bolt holes therein in a manner so that approximately symmetrical characteristic bending moment curves are obtained along lines passing through the axis of each bolt hole and to both sides of the holes. This results, in connection with each bolt hole, in a section of the packet end face that is practically planar to both sides of the clamping point.

6 Claims, 6 Drawing Figures

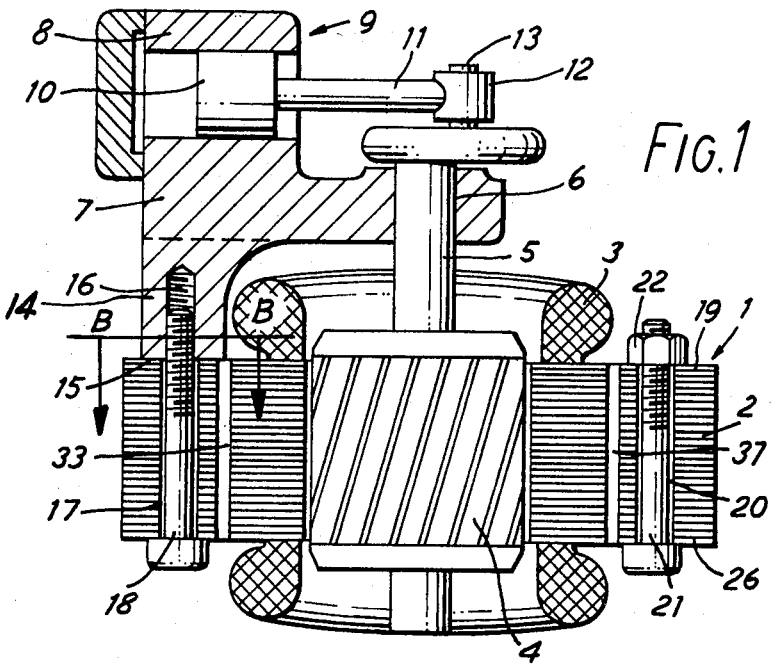

ELECTRIC MOTOR, PARTICULARLY MOTOR-COMPRESSOR

This is a continuation of the application Ser. No. 30,512, filed Apr. 16, 1979 now abandoned.

The invention relates to an electric motor in which the planar base surface of a bearing member carrying the rotor shaft is pressed against the end face of the packet of stator laminations with the aid of bolts passing through holes in the packet, particularly a motor compressor in which the rotor is supported at only one side, the bearing member also carries the fixed part of the compressor and the associated bolts are provided substantially only on one side of a longitudinal medial plane.

In known electric motors, the laminations of the stator packet are held together with the aid of screw-threaded bolts extending through holes near the periphery, and/or by clamping means, weld lines or the like provided at the periphery. As a result, the packet of laminations is thinner near the clamping points than it is between these clamping points or at the inner periphery. These differences in thickness are enhanced by the fact that the cut edges of the stamped laminations exhibit a slight burr which can be compressed by the clamping means but gives rise to a certain amount of spreading of the laminations at the rest of the cut edges. The ends of the packet of laminations are therefore not planar. Consequently, the entire planar base surface of the bearing member does not lie on the end face of the packet of laminations. This causes unnecessarily high and to some extent damaging surface pressures. This applies especially to comparatively small base surfaces where a comparatively large surface load must be expected to begin with.

A particularly serious disadvantage arises in the case of motor compressors in which the bolts holding the bearing member are provided substantially on only one side of a longitudinal medial plane. In this construction, the bearing is given an axis which, because of the curvature of the end face of the packet of laminations, departs from the stator axis. With the rotor supported on both sides, this leads to a corresponding load on the shaft and with the rotor supported on one side it leads to such an inclined position of the rotor axis that operation is possible only with a much larger internal diameter of the stator. Added to this in the case of motor compressors, the bearing member secured on only one side of the longitudinal medial plane also carries the fixed part of the compressor and is therefore strongly loaded by radial forces which can lead to tilting of the bearing member if its planar base surface is seated on a curved end face of the packet of laminations.

The invention is therefore based on the problem of providing an electric motor of the aforementioned kind in which the end face of the stator packet of laminations is more closely adapted to the planar base surface of the bearing member.

This problem is solved according to the invention in that the holes are so disposed between cut edges of the individual laminations that an approximately symmetrical characteristic bending moment curve is obtained along a line passing through the hole and to both sides of the hole, and that the base surface extends in the direction of this line over only a short distance to both sides of the hole.

An approximately symmetrical characteristic bending moment line to both sides of the clamping point results in a section of the end face that is practically planar to both sides of the clamping point. The base surface is applied to this planar area. The entire base surface therefore abuts the packet of laminations and surface pressures are correspondingly low. In addition, this planar section is perpendicular to the stator axis so that the axis of the bearing and thus the rotor axis will always be coaxial with the stator axis.

In one embodiment, the holes are spaced a considerable distance from the peripheral edge. In this way the flexure resulting between the clamping point and the inner periphery is also achieved between the clamping point and the outer periphery.

However, a particularly preferred embodiment is where on the side opposite the peripheral edge the holes are adjacent a respective slot spaced from the hole by a distance substantially equal to the spacing of the hole from the peripheral edge. In this case the holes remain near the outer periphery and space is saved. By means of the slot, the flexure obtained between the hole and the outer periphery is also achieved on the opposite side of the hole. Since the slot likewise represents a cut edge with a slight burr, roughly symmetrical conditions are obtained on both sides of the hole and produce a practically planar section for the end face.

If the slot is intersected by a radial line through the hole, the influence of the curvature which is comparatively strong towards the inner periphery is eliminated. If the slot is intersected by a line connecting two holes, the influence of the curvature remaining between the holes is eliminated. Of course both features can also be adopted simultaneously if particularly high requirements are placed on the secure attachment of the bearing member.

In a motor compressor in which the laminations have a substantially rectangular outline with bevelled corners, it is advisable for the slots, in relation to the axis of the hole, to extend substantially axially symmetrical to the bevelled corner. The slots can also be disposed between the holes, be parallel to each other and be substantially perpendicular to the adjacent peripheral edge. If both features are employed at once, it is desirable for each hole to be associated with an angular slot having a section substantially parallel to the bevelled corner and a section directed from the end thereof towards the adjacent peripheral edge.

In practice, it has proved advantageous if, with a base surface on only one side of the longitudinal medial plane, the laminations are symmetrical to the longitudinal medial plane and also carry slots on the side opposite the bearing member. Although the slots on the opposite side are not required, they are not detrimental. However, they permit the individual laminations to be stacked in known manner by being respectively displaced through 180° in relation to the rolling direction so as to compensate for the thickness of the laminations.

The bearing member is desirably supported on the packet of laminations by legs of which the base surface is confined to the region directly around the associated hole. By appropriately forming the lamination, a supporting surface can be created for this region that is planar not only in the radial direction but also in every other direction.

To make the base surface of each leg as large as possible, it should be bounded by lines which substantially coincide with the adjacent peripheral edges and slots.

The invention will now be described in more detail with reference to examples illustrated in the drawing, wherein:

FIG. 1 is a longitudinal section through a motor compressor taken on the line A—A in FIG. 2;

FIG. 2 shows a lamination as a cross-section taken through the packet of laminations;

FIG. 3 is a section through one leg of the bearing member;

FIG. 4 is a fragmentary view of a second embodiment of lamination;

FIG. 5 is a fragmentary view of a further embodiment of a lamination.

Figure 6:
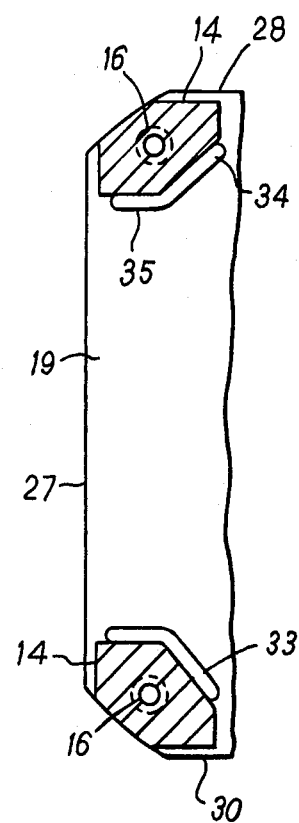
FIG. 6 is a fragmentary horizontal sectional view taken on line B—B of FIG. 1.

The motor compressor in FIG. 1 comprises a stator 1 with a packet 2 of laminations and a stator winding 3. A rotor 4 is seated on a motor shaft 5 which is held in a bearing 6 of a bearing member 7. The latter is also formed with a cylinder 8 of a compressor 9 of which the piston 10 is connected by way of a connecting rod 11, a crank bearing 12 and a crank pin 13 to the motor shaft 5. The bearing member 7 has two legs 14 of which the cross-section is visible from FIG. 3 and which possess a planar base surface 15 at the bottom. Extending from this base surface there is a tapped hole 16 receiving a screw-threaded bolt 18 that passes through holes 17 in the packet 2 of laminations, whereby the base surface 15 is pressed against the end face 19 of the packet 2 and the bearing member 7 is thereby held to the packet 2. Further, the packet of laminations has further holes 20 receiving screw-threaded bolts 21 which are provided with nuts 22. In this way the rectangular packet of laminations is clamped together at four corners by screw-threaded bolts 18 and 21. Additional clamping means 23 are provided in grooves 24 at the peripheral surface 25 of the packet of laminations. These means can be clamps, weld seams or the like.

The packet 2 of laminations of FIG. 1 consists of laminations 26 which are shown in FIG. 2. The outer periphery consists of peripheral edges 27, 28, 29 and 30 which define a rectangle, the corners 31 being bevelled. The inner periphery is provided with grooves 32. The holes 17 are each associated with a slot 33 consisting of two sections 34 and 35. The section 34 extends substantially axially symmetrical to the bevelled corner 31 in relation to the axis of the hole and the section 35 extends substantially axially symmetrical to the peripheral edge 28. Consequently a practically planar surface on which the base surface 15 of the legs 14 is securely seated is formed in the region 36 bounded substantially by the slot 33, the bevelled corner 31 and the adjacent parts of the peripheral edges 27 and 28. Curvatures in the end face 19 produced radially inwardly of the slot 33 or between the two slots 33 are insignificant for the attachment of the bearing member 7.

The holes 22 are associated in asymmetrical mirror image with slots 37 which permit the laminations 26 to be stacked on each other after being turned through 180° in each case, this making it possible to compensate for differences in thickness without requiring any other change in the assembly.

In the embodiment of FIG. 4, a hole 117 is associated with a slot 133 which, beneath the bearing member 7, extends substantially perpendicular to the peripheral edge 27. This slot 133 substantially corresponds to the section 35 of the slot 33. In FIG. 5 a hole 217 is associated with a slot 233 which extends between the hole and the inner periphery. This slot substantially corresponds to the section 34 of the slot 33. If the slots 133 and 233 are sufficiently long, they will often also suffice for achieving an adequately planar region in the vicinity of the holes.

A similar effect is achieved if one dispenses with the slots and instead displaces the holes 17 further radially inwardly or if one enlarges the lamination radially outwardly of the holes 17.

What is claimed is:

1. An electric motor and compressor assembly, comprising, a motor unit having rotor shaft and a packet of rectangularly shaped stator laminations, said laminations having an end face and at least two corners of said packet on one side of said shaft having first and second bolt holes extending through said laminations and said end face, said packet corners forming corner edges of said end face, a compressor unit having a frame member with a bearing for said shaft and two legs with planar base surface portions engaging said packet end face in respective surrounding relation to said first and second bolt holes, threaded bores in said legs in alignment with said bolt holes, threaded bolts extending through said bolt holes into said threaded bores, a slot extending through said packet and being so formed and spaced from said first bolt hole and the corresponding said corner edge if said end face so that an approximately symmetrical characteristic bending moment curve is obtained along a first line passing through the axis of said first bolt hole and to both sides thereof, said planar base surface portion surrounding said first bolt hole extending in the direction of said first line only short distances to both sides of said first hole.

2. An assembly according to claim 1, characterized in that said slot is spaced from said first hole a distance substantially equal to the spacing of said first bolt hole from the surrounding peripheral edge of said packet.

3. An assembly according to claim 1, characterized in that a second slot extends through said packet and being so formed and spaced from said second bolt hole so that an approximately symmetrical characteristic bending moment curve is obtained along a second line passing through the axis of said second bolt hole and to both sides thereof, said planar base surface portion surrounding said second bolt hole extending in the directions of said second line only short distances to both sides of said second bolt hole, said second slot being spaced from said second bolt hole a distance substantially equal to the spacing of said second bolt hole from the surrounding peripheral edge of said packet, said slots being intersected by a line extending between the axes of said first and second bolt holes.

4. An assembly according to claim 3, in which said laminations have bevelled corners, said slots extending substantially symmetrically relative to the respective ones of said bevelled corners with which said slots are associated.

5. An assembly according to claim 3, characterized in that said slots are parallel to each other and are substantially perpendicular to the adjacent peripheral edge of said packet.

6. An assembly according to claim 3, characterized in that each of said first and second slots is an angularly shaped slot having a first section substantially parallel to the adjacent bevelled corner and a second section substantially perpendicular to the adjacent peripheral packet edge.

* * * * *